Jan. 25, 1955 M. B. FINKELSTEIN 2,700,747
POWER SUPPLY SYSTEM
Filed Dec. 29, 1951

INVENTOR
Morris B. Finkelstein
BY Morris Rabkin
ATTORNEY

United States Patent Office 2,700,747

Patented Jan. 25, 1955

2,700,747

POWER SUPPLY SYSTEM

Morris B. Finkelstein, Camden, N. J., assignor to Radio Corporation of America, a corporation of Delaware Application December 29, 1951, Serial No. 264,198

11 Claims. (Cl. 321—2)

Figure 1:
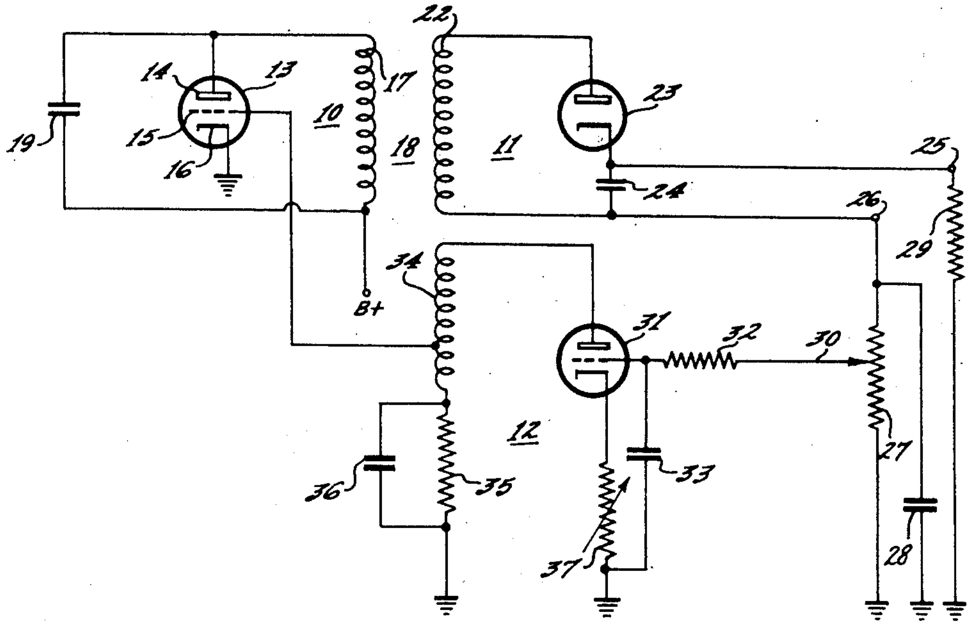

This invention relates, in general, to unidirectional, high voltage, power supply systems for variable impedance loads. More particularly, the invention relates to radio-frequency power supply systems for supplying a regulated, unidirectional high voltage to cathode ray tubes used in color television receivers.

With the advent of color television came the need for power supply systems, for color television receivers, capable of delivering an output voltage of a much higher order than that generally used in conventional, monochrome television receivers. Many of the circuits now developed for color television receivers require energizing potentials of the order of twenty thousand volts, and more, for their cathode ray tubes. Conventional power supply systems, using heavy transformers, may be used but these are bulky, expensive and dangerous and, hence, undesirable.

Radio-frequency power supplies capable of delivering a relatively high, unidirectional voltage at low current drain have been proposed for use in television receivers. Since the voltage output of a power supply of this type varies greatly with changes in the load impedance, a regulating circuit is necessary to maintain the voltage output substantially constant over a wide range of load impedances.

Regulated, radio-frequency power supplies are well known in the art. These power supplies usually comprise an oscillator circuit, a rectifying circuit inductively coupled thereto, and a control circuit. A conventional means for regulating a power supply of this nature is to control the amplitude of the oscillations in the oscillator circuit by a variable impedance in series with one of the electrodes, other than the oscillator excitation grid, of an oscillator tube. The variable impedance, usually an electron tube in the control circuit, tends to vary directly with the tendency of the output voltage to vary and is in series with either the anode, the screen grid, or a grid other than the oscillator excitation grid of the oscillator tube. This means of regulation, however, while satisfactory for power supplies for conventional monochrome television receivers, has several disadvantages with regard to its use in efficient, color television receivers requiring a very high voltage output. Multi-grid tubes of the pentagrid type, for example, in use today as oscillators, are not capable of producing the high voltages required in certain color television receivers. Another disadvantage is the fact that the variable impedance in the regulating circuit dissipates too great a proportion of the power input to the radio-frequency power supply. Also, the regulating circuit uses continuous, direct current supplied by this power input and is an additional drain thereon. Where the oscillator power output requirements are high and the voltage input (B+ voltage supply) thereto is limited, it is important that the power dissipated by the regulating circuit be reduced to a minimum.

It is, therefore, an important object of this invention to provide an improved and highly efficient, radio-frequency, high voltage power supply having a regulating circuit that is economical of power consumption, space and components.

It is another object of this invention to provide an improved, regulated, radio-frequency power supply wherein the operating efficiency is increased by a novel regulating circuit employing oscillator excitation grid control instead of the usual anode control.

Still another object of this invention is to provide an improved, regulated, radio-frequency power supply utilizing pulse techniques to control the oscillator bias, thereby permitting the use of a smaller and less expensive control tube.

A further object of this invention is to provide a more efficient, regulated, radio-frequency power supply employing an oscillator tube the bias of which a rectified radio-frequency voltage, is produced by plate rectification in the control circuit.

According to the invention, these and other objects and advantages are attained in a regulated, radio-frequency, high voltage power supply comprising an oscillator circuit, a rectifying circuit and a regulating or control circuit. The entire power output of a B+ supply is applied to the oscillator circuit. Once the oscillations have begun, an oscillator bias is provided by a rectified, radio-frequency, pulsating voltage generated in the regulating circuit. The rectifying circuit is inductively coupled to the oscillator circuit and its high voltage output is regulated by controlling the grid bias of the oscillator which, in turn, controls the amplitude of oscillations in the oscillator circuit. The grid bias of the oscillator is controlled by a sampled output voltage which, in turn, controls the plate rectifier action of a control tube in the regulating circuit. The improvement in the operating efficiency of the power supply is due to regulation by oscillator excitation grid control rather than by oscillator anode or screen grid voltage control which dissipates energy in the control circuit, as is usually done. Since the control tube of the present invention acts as a half wave rectifier, it has a smaller duty cycle than tubes which operate continuously, and may, therefore, be of a smaller and less expensive variety than the latter.

Figure 2:
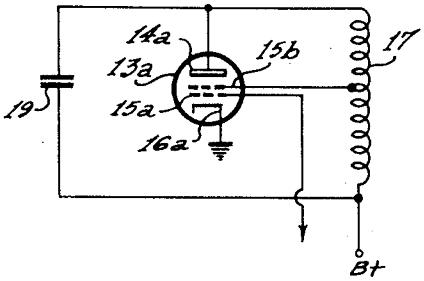
Figure 3:
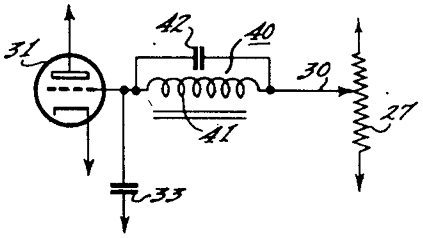

For a better understanding of the present invention, reference is had to the following description taken in connection with the accompanying drawing in which Fig. 1 is a circuit diagram of a preferred form of a regulated, radio-frequency, high voltage power supply system in accordance with the present invention, and Figs. 2 and 3 are circuit diagrams illustrating modifications of portions of the circuit diagram shown in Fig. 1.

Referring, now, with more particularity to the drawing, the regulated power supply comprises, generally, an oscillator circuit 10, a rectifying circuit 11, and a regulating or control circuit 12. The oscillator circuit comprises an oscillator tube 13 having an anode 14, an oscillator excitation grid 15, and a cathode 16. The tube 13 may be of any suitable type capable of a high power output with a relatively high mutual conductance. The anode 14 is connected to a source of B+ supply through a primary winding 17 of a transformer 18. A capacitor 19 is connected across the ends of the winding 17 to form a resonant circuit therewith. The cathode 16 is grounded.

The rectifying circuit 11 is inductively coupled to the primary winding 17 in the oscillator circuit 10 by means of a secondary winding 22 of the transformer 18. A diode high-voltage rectifier tube 23 has its anode connected to one end of the winding 22, and its cathode connected to the other end of the winding 22 through a filter capacitor 24. A positive high voltage output terminal 25 is connected to the cathode of the rectifier 23, and a negative terminal 26 is connected between one side of the capacitor 24 and the adjacent end of the secondary winding 22. The negative terminal 26 is also connected to ground through a resistor 27 in parallel with a high-frequency filter capacitor 28. A resistor 29, connected between the positive terminal 25 and ground, represents a load on the power supply system. When the load is a cathode ray tube, the resistor 29 represents an impedance variable in accordance with the conduction through the cathode ray tube.

An adjustable contact 30 on the resistor 27 is connected to the control grid of a control tube 31, in the regulating circuit 12, through a resistor 32. The grid of the tube 31 is grounded through a high-frequency, by-pass capacitor 33. The resistor 32 and capacitor 33 form a high-frequency filter network. The plate of the control tube 31 is connected to ground through a feedback winding 34 in series with a parallel network comprising a resistor 35 and a capacitor 36. The feedback coil 34 is inductively coupled to the secondary winding 22 of the transformer 18 so that the plate of the control tube 31 is furnished with an alternating voltage. The cathode of the tube 31 is grounded through a variable resistor 37. The grid 15 of the oscillator circuit 10 is connected to a tap on the feedback winding 34, in the control circuit 12, for the purpose appearing hereinafter.

The operation of the power supply in its unregulated state is basically similar to that of the power supply described in the U. S. Patent No. 2,374,781, issued to O. H. Schade on May 1, 1945.

When the load, represented by the resistor 29, is a constant impedance, the operation of the power supply is as follows: The high frequency oscillations produced in the primary winding 17, in the oscillator circuit 10, will induce a stepped-up voltage in the secondary winding 22, in the rectifying circuit 11. This stepped-up voltage is rectified by the diode tube 23 to produce a unidirectional voltage across the positive and negative terminals 25, 26. It will be noted that the grid bias on the oscillator excitation grid of the oscillator tube 13 is furnished by the voltage drop across the bias resistor 35. This latter voltage is the result of plate rectification in the control circuit 12. Since the plate of the control tube 31 is supplied with an alternating voltage by the feedback winding 34, inductively coupled to the secondary winding 22 of the transformer 18, the bias potential across the resistor 35 will be a pulsating voltage of the same frequency as the oscillations in the oscillator circuit 10.

Let it be assumed, now, that the load impedance, resistor 29, is decreased so that the voltage output of the power supply will tend to fall due to the internal impedance of the power supply. The increased current flowing through the load, resistor 29, will also flow through the resistor 27 and cause potential on the grid of the control tube 31 to become more negative with respect to ground. The conductance through the tube 31 is, therefore, decreased and less plate rectification of the voltage across the feedback winding 34 will result. The oscillator bias, the voltage across the resistor 35, now becomes less negative with respect to ground and, in turn, causes the amplitude of the oscillations in the oscillator circuit 10 to increase. The tendency of the output voltage across the load resistor 29 to drop, is, therefore, offset by the tendency of the amplitude of the voltage oscillations, in the oscillator circuit 10, to increase. If the load impedance, the resistor 29 were to increase, a reverse set of conditions would occur. The output voltage is thus maintained substantially constant with variations in the load.

To maintain a desired output voltage at full load, the adjustable tap 30 is moved along the resistor 27 until such output voltage is obtained. Under conditions of no load, the potential on the grid of the control tube 31 is zero, and the variable resistor 37 may thereupon be adjusted to control the amount of plate rectification, and hence, the bias applied to the oscillator tube 13.

Fig. 2 illustrates a modified embodiment of the oscillator circuit of the power supply in which a tetrode **13*a* is used as a radio-frequency oscillator instead of the triode tube 13, shown in Fig. 1. For a very high power output of the power supply, a tetrode is preferred to a triode as an oscillator tube. The tetrode 13*a* has an anode 14*a*, an oscillator excitation grid 15*a*, and a cathode 16*a* connected in circuit in the same manner as the anode 14, the oscillator excitation grid 15, and the cathode 16 of the triode 13, respectively. A screen grid 15*b* of the tetrode 13*a* is connected to a suitable tap on the primary winding 17 of the transformer 18**.

The resistor 32 may be replaced by a radio-frequency filter network 40 comprising an inductance 41 and a capacitor 42 both connected between the grid of the control tube 31 and the adjustable tap 30 on the resistor 27, as shown in Fig. 3. The filter network 40 is a tuned circuit that may be adjusted to control the phase and the amplitude of the residual radio-frequency oscillations that are applied to the grid of the control tube 31. Said residual, radio-frequency oscillations are those remaining at the load sampling point where the adjustable tap 30 contacts the resistor 27. This is another means of controlling the output voltage of the power supply.

Thus, it is seen that there has been provided a radio-frequency power supply system employing means to automatically regulate a unidirectional, high-output voltage under conditions of varying load. The circuit of the power supply system is economical of space and components and operates at a high efficiency. For example, in a power supply system of the type described, capable of delivering in excess of twenty kilovolts, regulation may be had to within 2 percent with changes in the load from zero to 1 ma. The improvement in operating efficiency is accomplished by regulation through oscillator excitation grid control of the oscillator tube instead of lowering the anode voltage, by dissipating energy in the control circuit, as is usually done. A small triode may be used for the control tube 31 since the regulating means is accomplished by the pulsed technique of controlled plate rectification.

While only a specific embodiment of the invention has been shown and described for the purpose of illustration, it is obvious that changes could be made without departing from the scope or spirit of the invention. Therefore, the foregoing description is to be considered as illustrative, and not in a limiting sense.

What is claimed is:

1. A radio-frequency power supply system for supplying a unidirectional high voltage to a variable load comprising an oscillator circuit, means to apply a source of low voltage to said oscillator circuit to generate oscillations therein, means for deriving from said oscillations a unidirectional, high voltage tending to vary with said load and for applying said high voltage to said load, a grid bias resistor in said oscillator circuit, means responsive to variations in said load comprising control circuit means including said grid bias resistor to produce rectified pulses of the frequency of said oscillations to control the amplitude thereof and to compensate the tendency of said high voltage to vary, said control circuit means having a control tube, and anode voltage means therefor comprising a feedback winding inductively coupled to said unidirectional high voltage deriving means.

2. A radio-frequency power supply system for supplying a unidirectional high voltage to a variable load comprising an oscillator circuit, means to apply a source of low voltage to said oscillator circuit to generate oscillations therein, means for deriving from said oscillations a unidirectional, high voltage tending to vary with said load and for applying said high voltage to said load, a grid bias resistor in said oscillator circuit, means responsive to variations in said load comprising control circuit means including said grid bias resistor to produce rectified pulses of the frequency of said oscillations to control the amplitude thereof and to compensate the tendency of said high voltage to vary, said oscillator circuit comprising an oscillator tube having at least an anode, a cathode, and a grid, said control circuit means to produce rectified pulses of the frequency of said oscillations comprising a control tube, and anode voltage means therefor comprising a feed-back winding inductively coupled to said voltage deriving means, said grid being connected to said feedback winding.

3. A radio-frequency power supply system for supplying a unidirectional high voltage to a variable load comprising an oscillator circuit, means to apply a source of low voltage to said oscillator circuit to generate oscillations therein, means for deriving from said oscillations a unidirectional, high voltage tending to vary with said load and for applying said high voltage to said load, a grid bias resistor in said oscillator circuit, means responsive to variations in said load comprising control circuit means including said grid bias resistor to produce rectified pulses of the frequency of said oscillations to control the amplitude thereof and to compensate the tendency of said high voltage to vary, said oscillator circuit comprising an oscillator tube having an oscillator excitation grid connected to said grid bias resistor, and said control circuit means to produce rectified pulses of the frequency of said oscillator comprising a control tube and an anode-cathode circuit therefor, said anode-cathode circuit including said grid bias resistor and means coupled to said unidirectional high voltage deriving means for supplying an operating voltage to said control tube.

4. A radio-frequency power supply system for supplying a unidirectional high voltage to a load of variable impedance comprising an oscillator tube having an oscillator excitation grid, means including said oscillator tube for generating oscillations, means for deriving from said oscillations said unidirectional high voltage tending to vary with variations in said load impedance and for applying said high voltage to said load to pass current therethrough, and means for maintaining substantially constant the magnitude of said high voltage comprising (1) control circuit means including a feedback winding coupled to said unidirectional high voltage deriving means for producing pulses of the frequency of said oscillations responsive to current through said load and (2) means for controlling the bias of said oscillator excitation grid to compensate the tendency of said high voltage to vary, said last-mentioned means comprising a resistor connected in common with said oscillations generating means and said control circuit means.

5. A radio-frequency power supply comprising an oscillator circuit, means to apply a source of relatively low voltage to said oscillator circuit to generate oscillations therein, a rectifying circuit comprising means to produce a unidirectional high voltage from said oscillations, a load applied across said rectifying circuit, and a control circuit inductively coupled to said rectifying circuit and comprising means responsive to variations in said load and means to control the amplitude of said oscillations in accordance with said variations whereby said high voltage is regulated.

6. A radio-frequency power supply as defined in claim 5 wherein said oscillator circuit comprises an oscillator tube having an oscillator excitation grid, said control circuit comprises a control tube having at least a cathode, a grid and a plate, a resistor, a capacitor in parallel with said resistor and in series with said cathode, a feedback winding in series with said plate and with said resistor and capacitor and inductively coupled to said rectifying circuit, said oscillator excitation grid being connected to said feedback winding, and said grid of said control tube being connected to said means responsive to variations in said load.

7. In a radio-frequency power supply of the type wherein a unidirectional high voltage supplied to a load tends to vary with the load, means to produce radio-frequency oscillations comprising an oscillator tube having an oscillator excitation grid, means to derive from said oscillations said unidirectional, high voltage, a control circuit comprising a feedback winding inductively coupled to said radio-frequency producing means, a resistor connected to one end of said feedback winding, a control tube having a grid, a cathode in series with said resistor, and a plate connected to the other end of said feedback winding, a capacitor connected across said resistor, a tap on said feedback winding, said oscillator excitation grid being connected to said tap, and means for controlling the bias of the grid of said control tube in accordance with current through the load, whereby a controlled pulsating bias is applied to said oscillator excitation grid to regulate said high voltage.

8. In a radio-frequency power supply for a load of variable impedance, a transformer comprising a primary winding, a secondary winding, a feedback winding inductively coupled to said secondary winding, oscillator means in circuit with said primary winding to induce radio-frequency oscillations in said windings, rectifying means in circuit with said secondary winding to rectify oscillations induced therein and to produce a unidirectional high voltage across said load, regulating means in circuit with said feedback winding to rectify oscillations induced therein and to produce unidirectional pulses of the frequency of said oscillations and comprising means responsive to current through said load for varying the amplitude of said pulses, an oscillator bias network comprising a resistor and a capacitor connected in parallel therewith, said network being connected in common with said oscillator means and said regulating means, and means to apply said pulses to said oscillator means, whereby said high voltage is regulated.

9. A radio-frequency power supply as defined in claim 8 wherein said oscillator means comprises an oscillator tube having an oscillator excitation grid, and said pulse applying means comprises a connection from said feedback winding to said oscillator excitation grid.

10. A radio-frequency power supply as defined in claim 8 wherein said oscillator means comprises an oscillator tube having an oscillator excitation grid, and a screen grid, said pulse applying means comprises a connection from said feedback winding to said oscillator excitation grid, a tap on said primary winding, and said screen grid being connected to said tap.

11. A radio-frequency power supply as defined in claim 8 wherein current responsive means comprises a control tube having a grid and an adjustable tuned filter network in series therewith whereby the phase and amplitude residual radio-frequency oscillations applied to said grid may be controlled.

References Cited in the file of this patent

UNITED STATES PATENTS

| | | |
|---|---|---|
| 2,386,548 | Fogel | Oct. 9, 1945 |
| 2,485,652 | Parker | Oct. 25, 1949 |
| 2,497,182 | Miller | Feb. 14, 1950 |
| 2,535,651 | Newman | Dec. 26, 1950 |
| 2,565,621 | Olson | Aug. 28, 1951 |